US007110862B2

(12) United States Patent
Park

(10) Patent No.: US 7,110,862 B2
(45) Date of Patent: Sep. 19, 2006

(54) APPARATUS AND METHOD FOR DIGITALLY CONTROLLING PLANT POT, AND METHOD FOR ORDERING PLANT POT DELIVERING ON-LINE

(76) Inventor: Jung-Yeon Park, 444-66 Buigwang 3, Jong, Eunphyung-Gu, Seoul (KR) 122-043

( * ) Notice: Subject to any disclaimer, the term of this patent is extended or adjusted under 35 U.S.C. 154(b) by 665 days.

(21) Appl. No.: 10/275,489

(22) PCT Filed: Apr. 30, 2001

(86) PCT No.: PCT/KR01/00713

§ 371 (c)(1),
(2), (4) Date: May 13, 2003

(87) PCT Pub. No.: WO01/91027

PCT Pub. Date: Nov. 29, 2001

(65) Prior Publication Data
US 2004/0030606 A1    Feb. 12, 2004

(51) Int. Cl.
G06D 7/00      (2006.01)
A01G 25/16     (2006.01)
G08B 21/20     (2006.01)
(52) U.S. Cl. .......................... 700/284; 47/79; 340/604
(58) Field of Classification Search ........ 700/282–284; 47/79–82, 84, 48.5; 206/423; 73/73; 340/604; 324/694
See application file for complete search history.

(56) References Cited

U.S. PATENT DOCUMENTS 4,020,417 A  *  4/1977  Brehob et al. ............. 324/694
4,268,824 A  *  5/1981  Phillips ..................... 340/604
4,503,707 A  *  3/1985  Rosa et al. ................. 374/142
4,514,722 A  *  4/1985  Batcheler et al. .......... 340/604
4,791,413 A  *  12/1988 Lyczek ...................... 340/604
4,931,775 A  *  6/1990  Sheriff ....................... 340/604
5,315,787 A  *  5/1994  Schleicher et al. ............ 47/79

(Continued)

FOREIGN PATENT DOCUMENTS

GB       2320572 A  *  6/1998

(Continued)

*Primary Examiner*—Maria N. Von Buhr
(74) *Attorney, Agent, or Firm*—John M. Naber; Dickinson Wright PLLC

(57) ABSTRACT

Provided is an apparatus of digitally controlling a plant pot including a case coupled to the outer circumference of the pot, a moisture sensor drawn from the case, for detecting moisture in soil contained in the pot, a liquid crystal display (LCD) installed in the case, for displaying a text or icons, an audio output portion for outputting a voice message, a message storage portion for storing an orderer's message and controlling messages, a data input/output portion connected to a personal computer, for inputting/outputting message data, a key input portion for inputting key signals through a key pad such as a power key or a record key, a battery for supplying power to each circuit block, and a controller for performing a plant pot controlling program, reading a message stored in the message storage portion in response to the moisture sensor and a signal from the key input portion to output a voice to the audio output portion, displaying the name of a plant planted on the pot and information for controlling the plant on the LCD in the form of a text, displaying the current control state of the plant pot in the form of an icon, and downloading the message data from the personal computer through the data input/output portion or uploading the control state data to the personal computer.

9 Claims, 15 Drawing Sheets

U.S. PATENT DOCUMENTS

| | | | | |
|---|---|---|---|---|
| 5,341,596 A | * | 8/1994 | Kao | 47/79 |
| 5,511,341 A | * | 4/1996 | Payne | 47/79 |
| 5,794,848 A | * | 8/1998 | Nunn et al. | 239/63 |
| 5,813,605 A | * | 9/1998 | Chou | 239/64 |
| 6,198,398 B1 | * | 3/2001 | Velasquez | 340/604 |
| 6,202,479 B1 | * | 3/2001 | Frybarger | 73/73 |

FOREIGN PATENT DOCUMENTS

| | | | |
|---|---|---|---|
| GB | 2353360 A | * | 2/2001 |

* cited by examiner

APPARATUS AND METHOD FOR DIGITALLY CONTROLLING PLANT POT, AND METHOD FOR ORDERING PLANT POT DELIVERING ON-LINE

TECHNICAL FIELD

The present invention relates to an apparatus and method for digitally controlling a plant pot, and a method for ordering and delivering a plant pot on-line, and more particularly, to an apparatus and method for digitally controlling a plant pot, in which a plant pot ordered by a sender is delivered to a recipient with a sender's voice message stored in a memory and the recipient can directly hear the sender's voice message when the recipient receives the plant pot, and a method for ordering and delivering a plant pot on-line.

BACKGROUND ART

In general, delivery of plant pots as congratulatory gifts in celebration of opening for business or other events is prevalent.

Up to date, delivery of a congratulatory plant pot has been made in such a manner that a sender's name was written on a ribbon put on the plant pot and a recipient found out the sender's name written on the ribbon. Thus, the sender must express his/her intention of sending a plant spot over the telephone prior to delivery of the same. In any event where the sender could not communicate the recipient, the sender must offer his/her congratulations over the telephone even after delivery.

After finishing a congratulatory event, the ribbon put on the plant pot must be removed. If the ribbon is removed, it is difficult to know who sent the plant pot, which is then inattentively taken care of. Thus, the plant set on the plant pot may be withered to death due to inattentive care.

Also, ordinary people tend to be ignorant of kinds of plants and characteristics thereof, except for several well-known plants, and they do not know how to cultivate the plants, leading to lack of affection for the plants or inattentive care of the same.

DISCLOSURE OF THE INVENTION

To overcome the problems of the prior art, it is a first object of the present invention to provide an apparatus and method of digitally controlling a plant pot, in which a digital plant pot controller is installed in a plat pot, thereby delivering a congratulatory message recorded by a sender to a recipient at the time of delivering the plant pot and allowing the plant pot to be controlled with care and affection at normal times by notifying a user of a watering time through audio-output.

It is a second object of the present invention to provide a method of ordering a plant pot for delivery on-line using a digital plant pot controller.

To accomplish the first object of the present invention, there is provided an apparatus of digitally controlling a plant pot comprising a case coupled to the outer circumference of the pot, a moisture sensor drawn from the case, for detecting moisture in soil contained in the pot, a liquid crystal display (LCD) installed in the case, for displaying a text or icons, an audio output portion for outputting a voice message, a message storage portion for storing an orderer's message and controlling messages, a data input/output portion connected to a personal computer, for inputting/outputting message data, a key input portion for inputting key signals through a key pad such as a power key or a record key, a battery for supplying power to each circuit block, and a controller for performing a plant pot controlling program, reading a message stored in the message storage portion in response to the moisture sensor and a signal from the key input portion to output a voice to the audio output portion, displaying the name of a plant planted on the pot and information for controlling the plant on the LCD in the form of a text, displaying the current control state of the plant pot in the form of an icon, and downloading the message data from the personal computer through the data input/output portion or uploading the control state data to the personal computer.

In the present invention, the data input/output portion is constituted by an RS232 or USB interface circuit for serial data communication with the personal computer, or an AM or FM wireless transceiver for wireless data communication with the personal computer.

Here, the downloaded data is supplied in the form of audio, video, MP3, WMA, ASF, RAM, RA, WAV or a combination thereof.

The icons are preferably expressed such that plat pot controlling state data is prepared for cases where water is supplied at an appropriate time and where water is not supplied at an appropriate time, in response to the output of a message requesting for taking care of the plant pot, and the fresh or withered state of the plant pot is preferably reflected on the icon to be displayed. Also, the icons may be variably expressed according to the growth periods of the plant.

The method according to the present invention includes the steps of a method of digitally controlling a plant pot comprising the steps of audio-outputting an orderer's voice message on delivery through initialization, displaying the name of a plant planted in the plant pot, displaying information related to the plant in the form of text and displaying a plant pot control state with icons, at normal times, detecting the moisture contained in the plant pot and determining whether watering is necessary or not, if it is determined that watering is necessary, displaying the determination in the form of a text and audio-outputting a message requesting for taking care of the plant, preparing plant pot control state data for cases where water is supplied at an appropriate time and where water is not supplied at an appropriate time, in response to the output of the message requesting for taking care of the plant pot, and reflecting and displaying the fresh or withered state of the plant on icons in response to the prepared plant pot control state data.

According to another aspect of the present invention, there is provided a method of ordering a plant pot for delivery on-line comprising the steps of uploading an order for delivery of a plant pot and a message file to be delivered with the plant pot onto a server connected on-line, relaying the uploaded order from the server to a vender nearest to a recipient, and transplanting an orderer's message on a digital plant pot controlling apparatus in response to the downloaded order and delivering the plant pot having a digital plant pot controlling apparatus.

Also, the present invention provides an apparatus of digitally controlling a plant pot comprising a case connected to the outer circumference of a plant pot, an electronic valve adhered to the case, for controlling the supply of water to the plant pot, a water tank connected to the electronic valve, a moisture sensor drawn from the case, for detecting moisture in the soil contained in the plant pot, a temperature sensor embedded in the case, for detecting the ambient temperature, an illumination sensor embedded in the case, for detecting the intensity of ambient illumination, a liquid crystal display installed in the case, for displaying a text or icons, an audio output portion installed in the case, for outputting a voice message, a message storage portion for storing orderer's messages and control messages, a data input/output portion connected to a personal computer, for inputting/outputting message data, a key input portion for inputting key signals through a key pad including a power key and a record key, a battery for supplying power to the respective circuits, and a controller for performing a plant pot controlling program, reading a message stored in the message storage portion in response to the moisture sensor, the illumination sensor, the temperature sensor and a signal from the key input portion to output a voice to the audio output portion, displaying the name of a plant planted on the pot and information for controlling the plant on the LCD in the form of a text, displaying the current control state of the plant pot in the form of an icon, downloading the message data from the personal computer through the data input/output portion or uploading the control state data to the personal computer, and supplying water to the plant pot by controlling the electronic valve if watering is necessary.

Alternatively, the present invention provides an apparatus of digitally controlling a plant pot comprising a case connected to the outer circumference of a plant pot, an operation sensor embedded in the case, for detecting the user's operation, a liquid crystal display installed in the case, for displaying a text or icons, an audio output portion installed in the case, for outputting a voice message, a message storage portion for storing orderer's messages and control messages, a key input portion for inputting key signals through a key pad including a power key and a record key, a battery for supplying power to the respective circuits, and a controller for performing a plant pot controlling program, reading a message stored in the message storage portion in response to the moisture sensor and a signal from the key input portion to output a voice to the audio output portion, displaying the name of a plant planted on the pot and information for controlling the plant on the LCD in the form of a text, and displaying the current control state of the plant pot in the form of an icon.

The apparatus according to the present invention may further comprise an operation display portion, wherein when an operation display mode is set, the controller displays a plant pot control state by flickering of a lamp of the operation display portion instead of outputting a message.

The operation sensor is one of an approaching sensor for detecting the approach of the user and a touch sensor for detecting the touch by the user.

BEST MODE FOR CARRYING OUT THE INVENTION

Preferred embodiments of the present invention will now be described in detail with reference to the accompanying drawings.

Figure 1A:
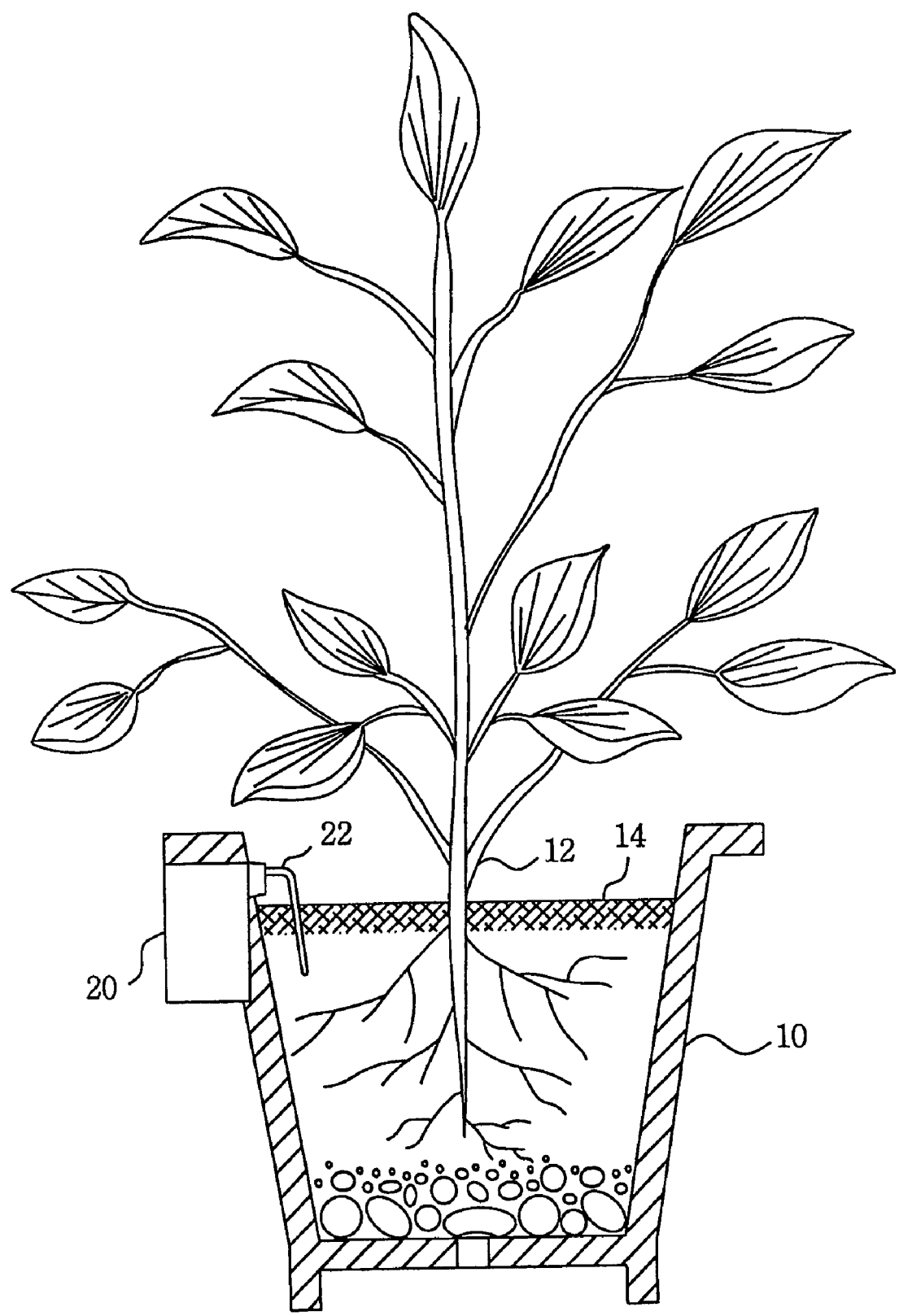
FIG. 1A is a cross-sectional view of a plant pot having a detachable digital plant pot controlling apparatus.
Figure 1B:
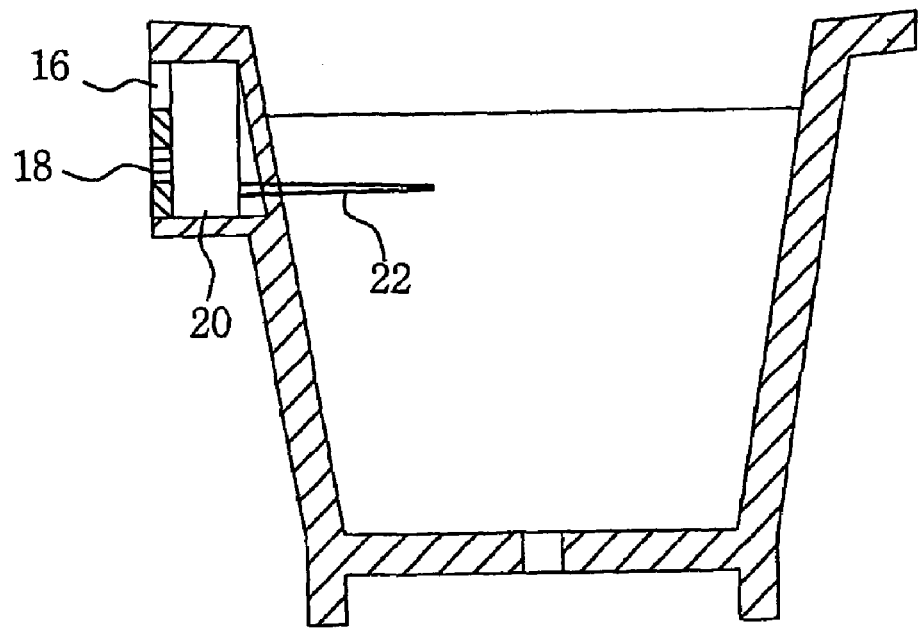
FIG. 1B is a cross-sectional view of a plant pot having a fixed digital plant pot controlling apparatus.

FIGS. 1A and 1B are cross-sectional views of a plant pot having a digital plant pot controlling apparatus according to the present invention. In the present invention, a digital plant pot controller 20 is installed on the outer circumference of a plant pot 10 having a plant 12 planted therein, and a moisture sensor 22 drawn from the digital plant pot controller 20 is installed in soil contained in the pot, thereby checking moisture of the soil in the plant pot.

The digital plant pot controller 20, as shown in the drawing, can be a detachable type (FIG. 1A) or a fixed type (FIG. 1B) in which it is fixedly mounted in the plant pot. The detachable controlling apparatus may be installed such that the moisture sensor 22, that is, a conductive rod, is put in the plant pot. Otherwise, a separate means, e.g., an installation structure such as a stapler, may be provided, or may be fastened by means of a screw.

The fixed controlling apparatus shown in FIG. 1B is constructed such that a controller mounting space is formed in the plant pot 10, a transparent window 16 is formed on the front surface of the controller mounting space so that an LCD screen is visible, and a throughhole 18 is formed to correspond to a speaker of the controlling apparatus.

Figure 2A:
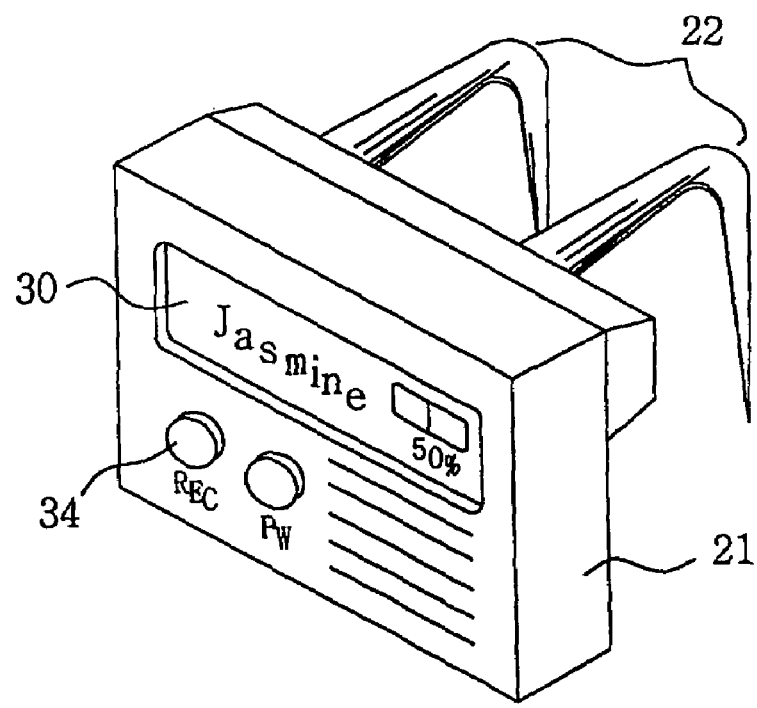
FIG. 2A is a perspective view of a memory-embedded digital plant pot controlling apparatus according to a preferred embodiment of the present invention.
Figure 2B:
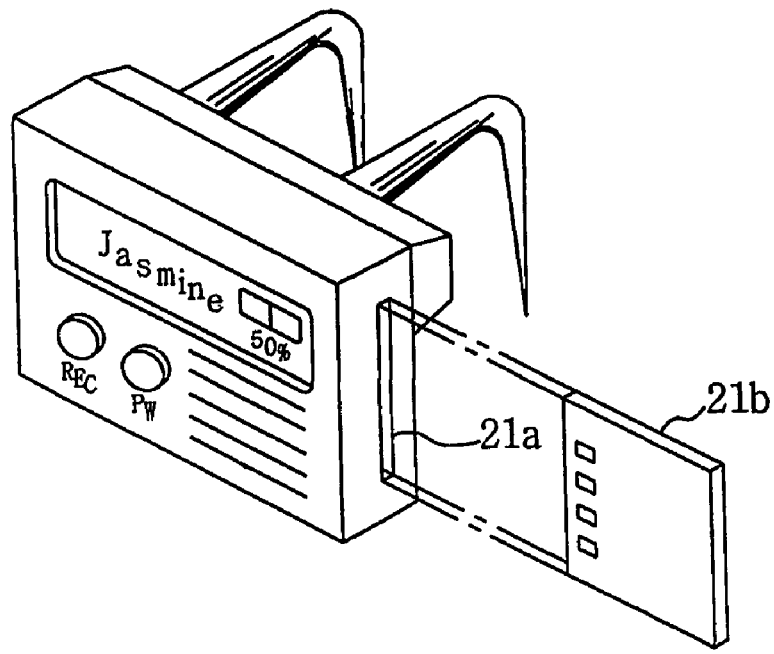
FIG. 2B is a perspective view of a memory card detachable digital plant pot controlling apparatus according to a preferred embodiment of the present invention.
Figure 3:
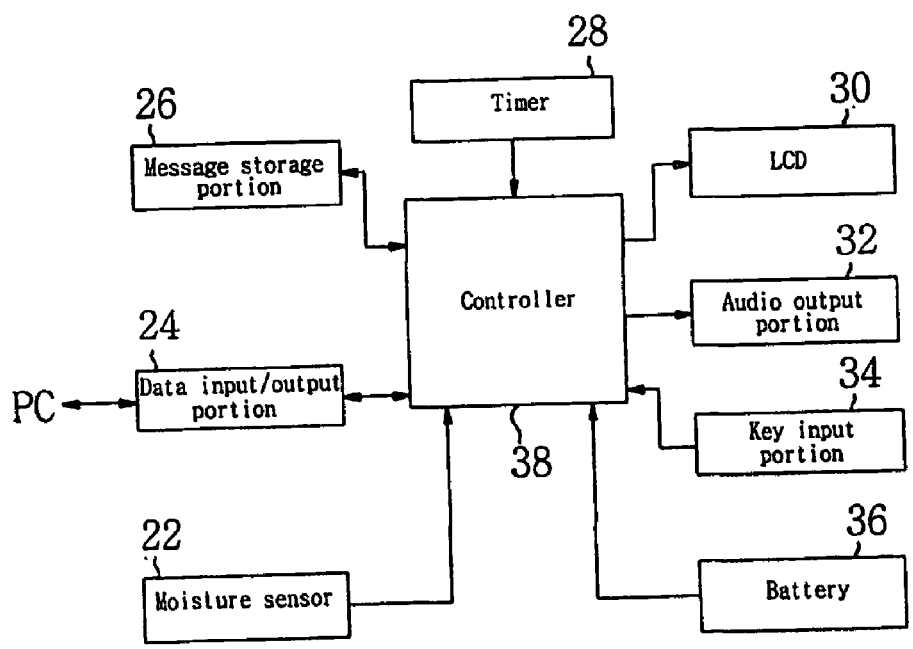
FIG. 3 is a circuit diagram of the plant pot controlling apparatus shown in FIG. 2.

FIGS. 2A and 2B are perspective views of a digital plant pot controlling apparatus according to a preferred embodiment of the present invention, and FIG. 3 is a block diagram of the digital plant pot controlling apparatus shown in FIG. 2.

The digital plant pot shown in FIG. 2A has an LCD panel 30 and a key pad 34 on the front surface of a case 21, and a pair of conductive rods bent at right angle are provided as the moisture sensor 22 at the rear surface of the case. The electrical resistance between the pair of conductive rods 22 put in the soil vary according to the amount of moisture absorbed into soil. The amount of moisture in the soil can be detected by detecting a change in the electrical resistance depending on the amount of moisture.

A detachable memory chip shown in FIG. 2B has a memory card insertion groove 21 formed at the lateral surface thereof, and a memory card 21b having a memory chip mounted thereon is inserted into the card insertion groove 21a. The detachable memory chip is advantageously used for a fixed plant pot.

The circuit of the present invention includes a moisture sensor 22, a data input/output portion 24, a message storage portion 26, a timer 28, an LCD 30, an audio output portion (22번역문이라 원문대로 옮깁니다만, 32부재번호 32라야 맞습니다. 22 는 수분감지쎈서입니다.), a key input portion 34 and a battery 36.

The data input portion 24 connected with a personal computer in wired or wireless manner, downloads orderer's voice message data input on-line or uploads plant pot control state data onto the personal computer. The data input portion 24 may adopt a wired input/output method, e.g., a general-purpose serial communication method such as RS232 or USB, or a wireless input/output method, e.g., an AM or FM based wireless transceiving method. Recently, use of a Bluetooth, which is a short distance (10 m or less) communication method, is preferred. Downloaded data may be supplied in the form of audio, video, MP3, WMA, ASF, RAM, RA, WAV or combinations thereof. Music files can be output as the background music during implementation of the present invention.

The message storage portion 26 is formed of a nonvolatile memory, e.g., EEPROM or a flash memory, and the storage capacity thereof is determined by the amount of messages stored. In the case of storing video data as well as audio data, a large capacity memory is required. The message storage portion 26 of a memory chip detachable type is formed of an interface circuit that contacts the terminal portion of a memory card to supply data and power.

The timer 28 supplies timing signals to the controller 38.

The LCD 30 displays information including the name and characteristics of a plant to be grown, words of caution in cultivating the plant, and so on, and displays icons representing the state of the plant according to the amount of moisture detected and the control state of the plant. In displaying icons, the growth periods, fresh or withered state of the plant may be preferably reflected on the icons to be varied according to passage of time.

The audio output portion 22 (상기.코멘트한 바와 같이, 32라야맞습니다.), including a speaker, audio-outputs a voice message supplied from the controlling apparatus or generates a warning sound. Also, the audio output portion 22 can executes a downloaded music file to be output as background music.

The key input portion 34, including a record key (REC) and a power key (PW), selects various functions through combinations of these keys.

The controller 38 is constituted by a microprocessor or microcomputer and peripheral circuits thereof. The controller 38 executes a plant pot-control program, which is stored in an ROM or RAM of the controller 38. An appropriate control program is executed according to the characteristics of the plant to be cultivated, e.g., watering time, amount of sunshine or tilling.

Figure 4:
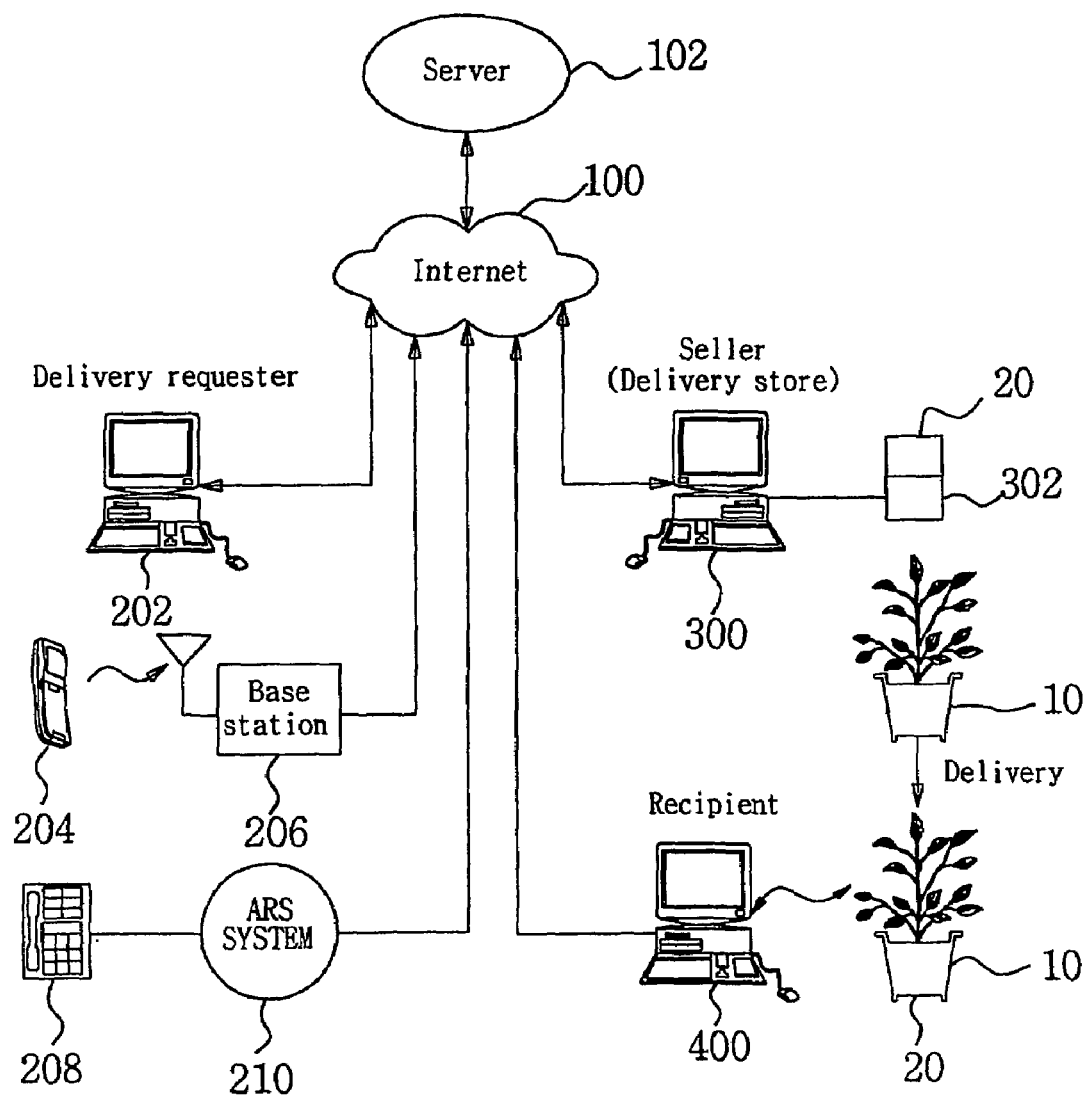
FIG. 4 is a schematic diagram of an on-line plant pot ordering system according to the present invention.

FIG. 4 is a schematic diagram of a system of ordering a plant pot on-line according to the present invention, including a server 102 connected to the Internet 100, an orderer's terminal 200, a delivery vendor's terminal 300 and a recipient's terminal 400.

The server 102 includes a service provider's web server and database servers. The server 102 provides services of ordering and delivering of plant pots on line through its homepage.

The orderer's terminal 200 includes a personal computer 202 directly connected to the Internet, a cellular phone connected through a ground station 206 and a general wired telephone 208 connected through an automatic response system (ARS) 210 of a public telephone network.

The orderer's voice messages or video messages are input through a microphone of the personal computer 202 or a computer video camera, an orderer's message file is created to place an order to the server 102.

The order containing the orderer's voice or video message is placed by the cellular phone 204, such as a wireless Internet phone, e.g., a digital cellular phone, PCS phone or IMT-2000 phone.

Also, ordering with a voice message can be made according to the automatic response ordering of the ARS 210 using a general telephone such as a pay phone, e.g., 080 service phone.

As described above, the orders made by the orderer contains the orderer's audio or video messages to be received in the server 102. The server 102 relays the received orders to the nearest delivery vendor's terminal 300 in response to the recipient's address.

The delivery vendor's terminal 300 prepares plant pots ordered based on the orders supplied from the server 102, transplants the orderer's audio or video messages to the digital plant pot controller 20 through a message transplanting device 302 connected to the terminal, and mounts the transplanted digital plant pot controller 20 on the ordered plant pot 10 for delivery. The message transplanting device may take wired and wireless methods according to data communication method of the controller 20.

A control program adapted to the plant cultivation characteristics is programmed in the digital plant pot controller 20. Otherwise, the control program adapted to the characteristics of the plant ordered may be transplanted by the vendor or deliverer.

The recipient's terminal 400 is connected to the digital plant pot controller 20 through data communication, that is, through RS232 serial port or a USB port in the case of wired data communication, or through a Bluetooth transceiver in the case of wireless data communication.

Thus, the recipient's terminal 400 directly provides plant pot control state data supplied from the digital plant pot controller 20 to the orderer's computer 202 or wireless Internet phone 204 or to the server 102 through the Internet. The plant pot control state data provided to the server 102 is classified by order code or orderer and managed by a database server. Thus, in the latter case, an orderer can connect to the server 102 to confirm the control state of the plant pot that the orderer has ordered for delivery.

Figure 5:
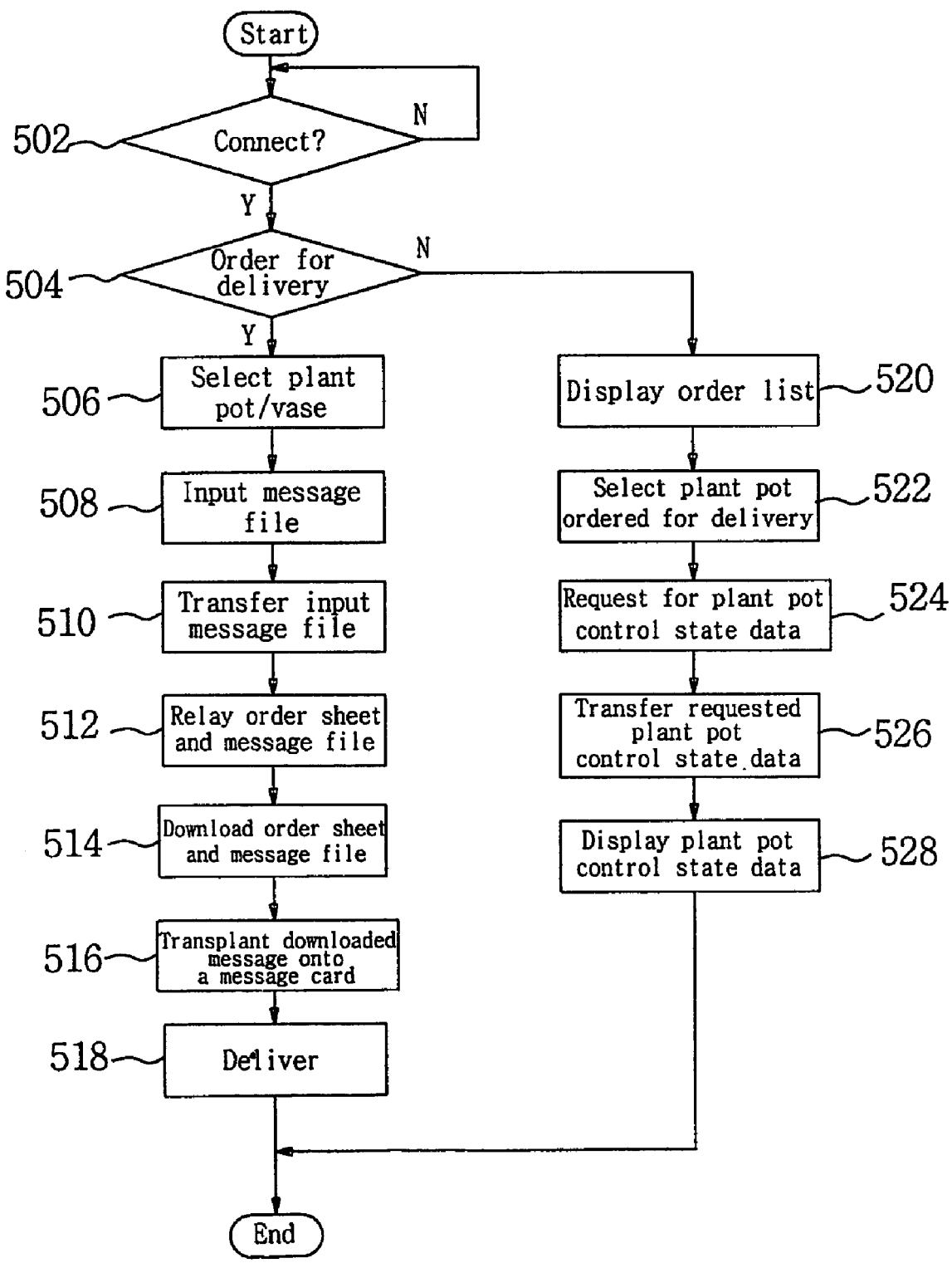
FIG. 5 is a flow chart for explaining the operation of the on-line plant pot ordering system according to the present invention.

FIG. 5 is a flow chart for explaining the operation of the on-line plant pot delivery ordering system according to the present invention. Referring to FIG. 5, if the orderer connects to a server (step 502) and places an order for delivery (step 504), the server supplies option information on the goods ordered for delivery, such as a plant pot or vase (step 506).

If the orderer places an order for delivery of a plant pot and inputs his/her message in audio or video data (step 508) to create a message file and transfers the created message file to the server (step 510). Subsequently, the server relays the orders in the form of combination of order sheets and message files to the nearest vender's terminal (step 512).

The vender's terminal downloads the orders (step 514) and transplants the downloaded orderer's message to the digital plant pot controller through the message transplanting device (step 516). Here, the control program adapted to the cultivation characteristics of the plant planted in the plant pot may also be transplanted on the message transplanting device. Subsequently, the digital plant pot controller having the message transplanted therein is mounted on the ordered plant pot to then be delivered to the recipient (step 518).

If the plant pot is not ordered for delivery in step 504, a list of orders is displayed (step 520). If a particular plant pot is selected on the list displayed on the screen (step 522), the plant pot control state data is requested for to the server (step 524).

Then, the server fetches the requested plant pot control state data from the database server and transfers the same to the orderer's terminal, personal computer or Internet phone such as IMT-2000 phone (step 526). Then, the transferred plant pot control state data is displayed on the screen (step 528).

Thus, the orderer can identify the recipient's plant pot control state through the server even after delivery, thereby checking the state of the plant pot sent by himself/herself on-line. Of course, this is possible only when the recipient uploads the plant pot control state data onto the server or directly transfers the same by e-mail.

Therefore, communication can be continuously made between the sender and the recipient through the plant pot control state.

Figure 6:
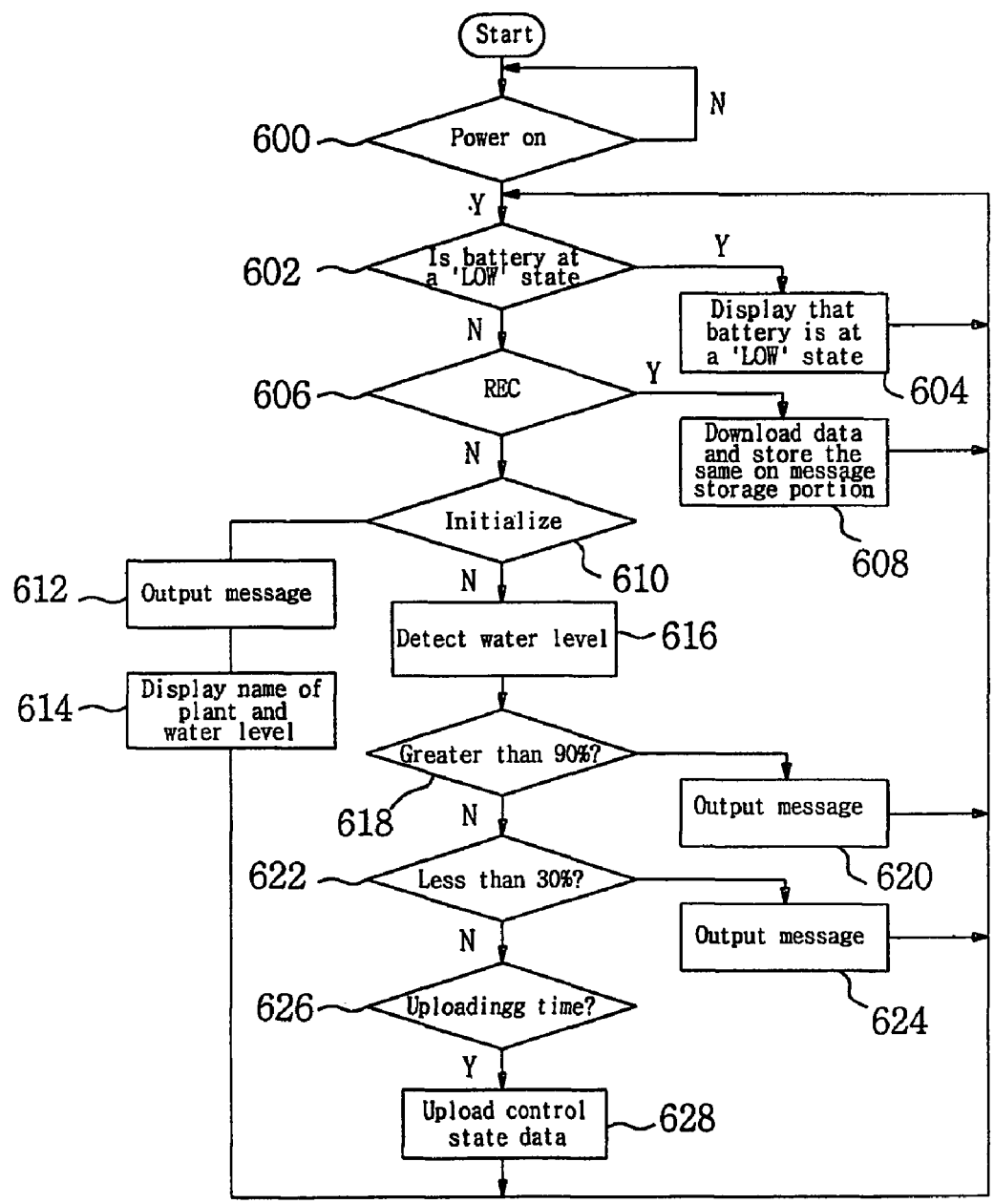
FIG. 6 is a flow chart for explaining the operation of the plant pot controlling apparatus shown in FIG. 3.

FIG. 6 is a flow chart for explaining the operation of the plant pot controlling apparatus shown in FIG. 3. In FIG. 6, the digital plant pot controlling apparatus checks whether the power is turned ON (step 600). If power is turned ON, it is checked whether the battery is at a 'LOW' state (step 602).

If the battery is at a 'LOW' state in step 620, the battery 'LOW' state is displayed on the LCD (step 604).

If the battery is at a normal state in step 620, it is checked whether the mode is a record mode (REC) (step 606). If yes, the data is downloaded from the personal computer through the data input/output portion and stored in the message storage portion (step 608).

If the mode is not REC in step 606, it is checked whether initialization is effected (step 610). If initialized, the orderer's message, e.g., a congratulatory message, is output in an audio or video manner (step 602). In other words, the recipient who has received the delivered plant pot turns power on, the sender's message is audio-output.

If the audio message is completely output, the name of a plant planted in the plant pot and the water level detected by the moisture sensor are displayed on the screen (step 614).

If not initialized in step 610, the amount of water in the soil contained in the plant pot is detected by a moisture sensor (step 616). If the detected amount of water is greater than 90%, it is determined that water is newly being supplied to the plant pot, audio messages saying "Hi. I am Jasmine. Thank you for your affection on me. I will grow well. I am a messenger sent by Mr./Ms ABC (sender's name)." and an icon representing a look of smile is displayed (step 620). Thus, the plant pot reminds the recipient of the sender at a watering time and the recipient thinks of sender's heart.

If the amount of water checked in step 618 is less than 30% (step 622), it is determined that watering is necessary, audio messages saying "Give me some water. Give me some water. I am thirsty. Please show me your affection." with background music and an icon representing a look of pain or anger is displayed (step 624).

Such messages are repeatedly output at constant intervals, e.g., 10 or 30 minutes.

If the amount of water is not less than 30% in step 622, it is checked whether an uploading time has come (step 626). If the uploading time has come, the control state data prepared based on the state information checked in steps 618 and 622 is uploaded onto the recipient's terminal through the data input/output portion (step 628). Thus, the recipient, that is one who has received the plant pot, transmits the state information to the server, the sender can receive the transmitted state information through the server.

Figure 7:
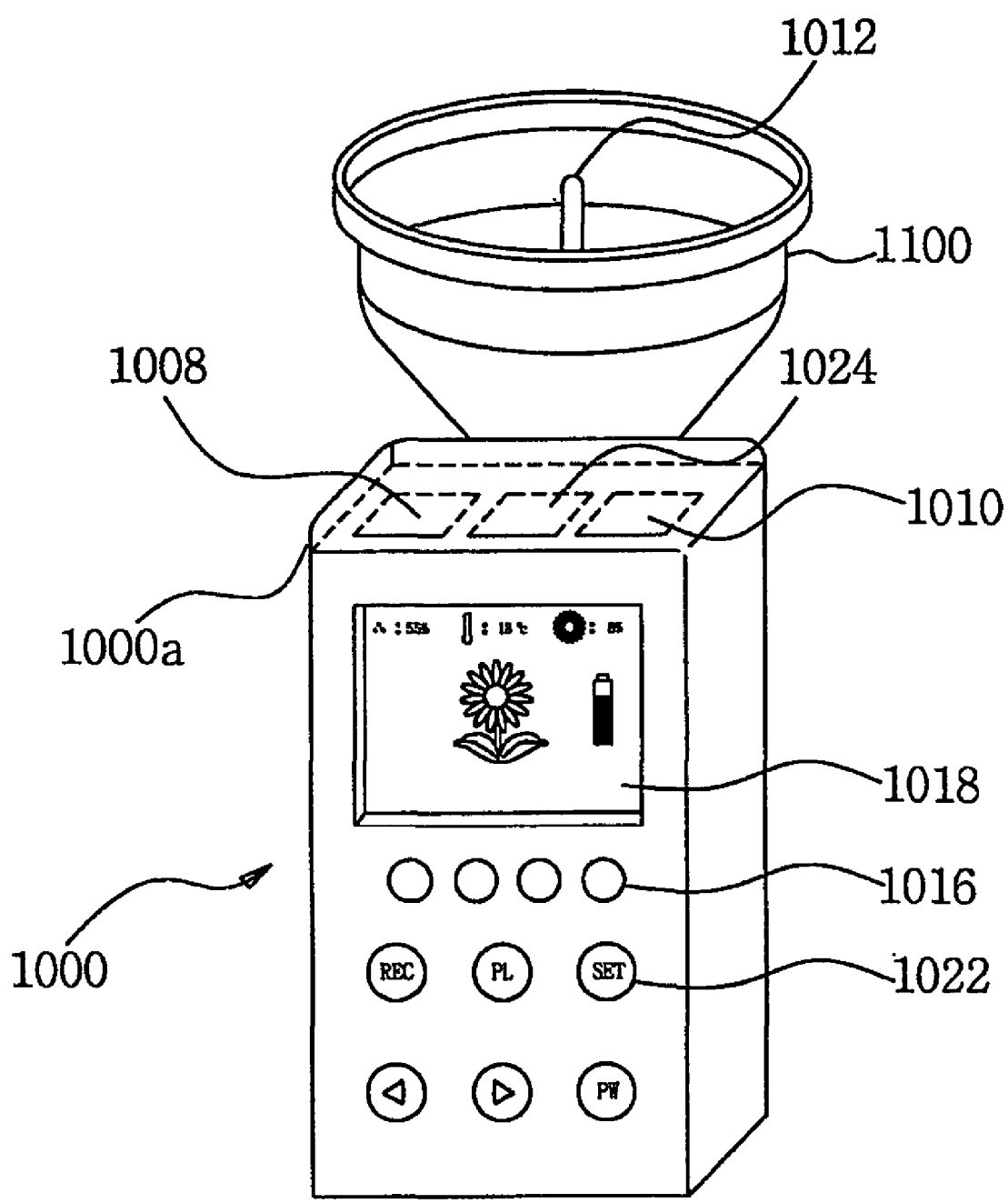
FIGS. 7 through 9 are a perspective view, a partly cross-sectional side view and a rear view of a digital plant pot controlling apparatus capable of automatically watering.
Figure 8:
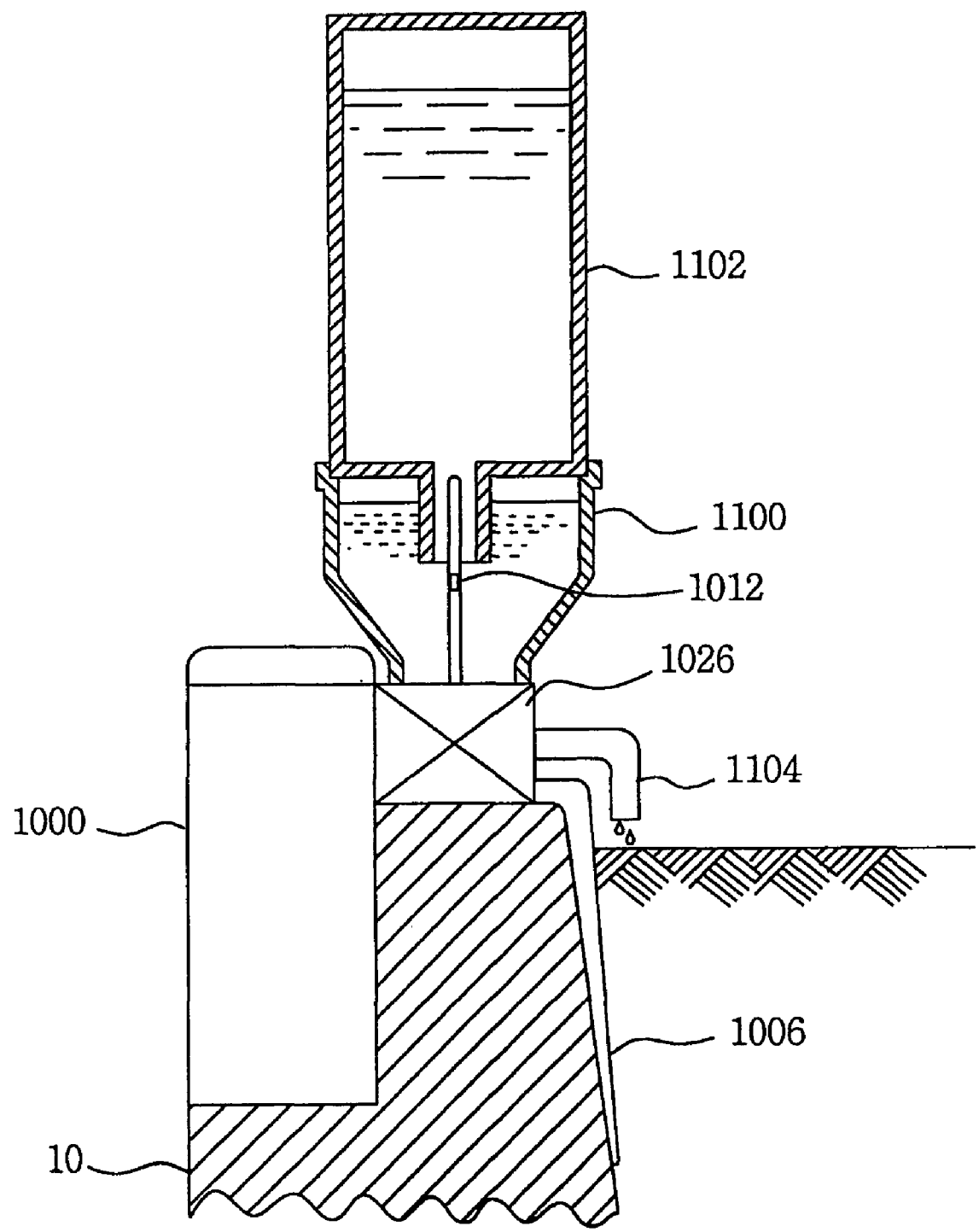
Figure 9:
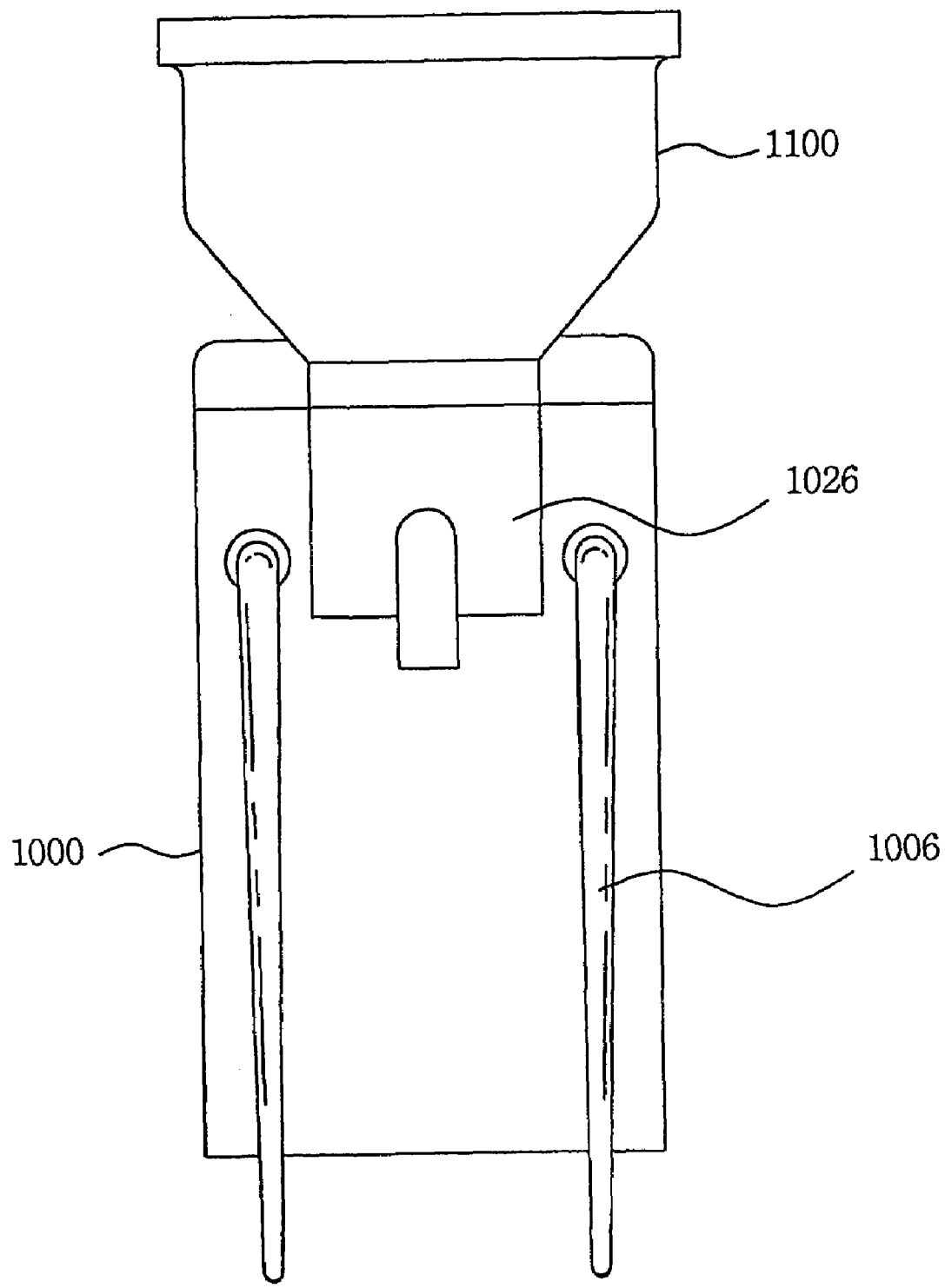

FIGS. 7 through 9 are a perspective view, a partly cross-sectional side view and a rear view of a digital plant pot controlling apparatus capable of automatically watering.

Referring to the drawing, the digital pot controlling apparatus according to another embodiment of the present invention includes a main body 1000, a transparent cap 1000a, a water tank 1012, a temperature sensor 1008, an approaching sensor 1024, an illumination sensor 1010, a water level sensor 1012, an electronic valve 1026, a moisture sensor 1006 and a supply pipe 1104.

The main body 1000 includes an LCD 1018, an operation display portion 1016 and a key input portion 1022. The operation display portion 1016 is a display lamp such as an LED. The key input portion 1022 includes a record (REC) key, a playback (PL) key, a setting (SET) key, a power (PW) key and up/down keys.

The water tank 1100 is connected to an inlet of the electronic valve 1026 and the supply pipe 1104 is connected to an outlet thereof. A water level sensor is incorporated inside a rod 1026 installed in the center of the water tank 1100 to detect the level of water contained in the water tank 1100. A bottle 1102 is connected to the water tank 1100 upside down so that the entrance thereof faces down.

Thus, when the water contained in the bottle 1102 is all removed and the water level of the water tank 1100 is lowered to a position of the water level sensor 1012, the water level is detected.

Figure 10:
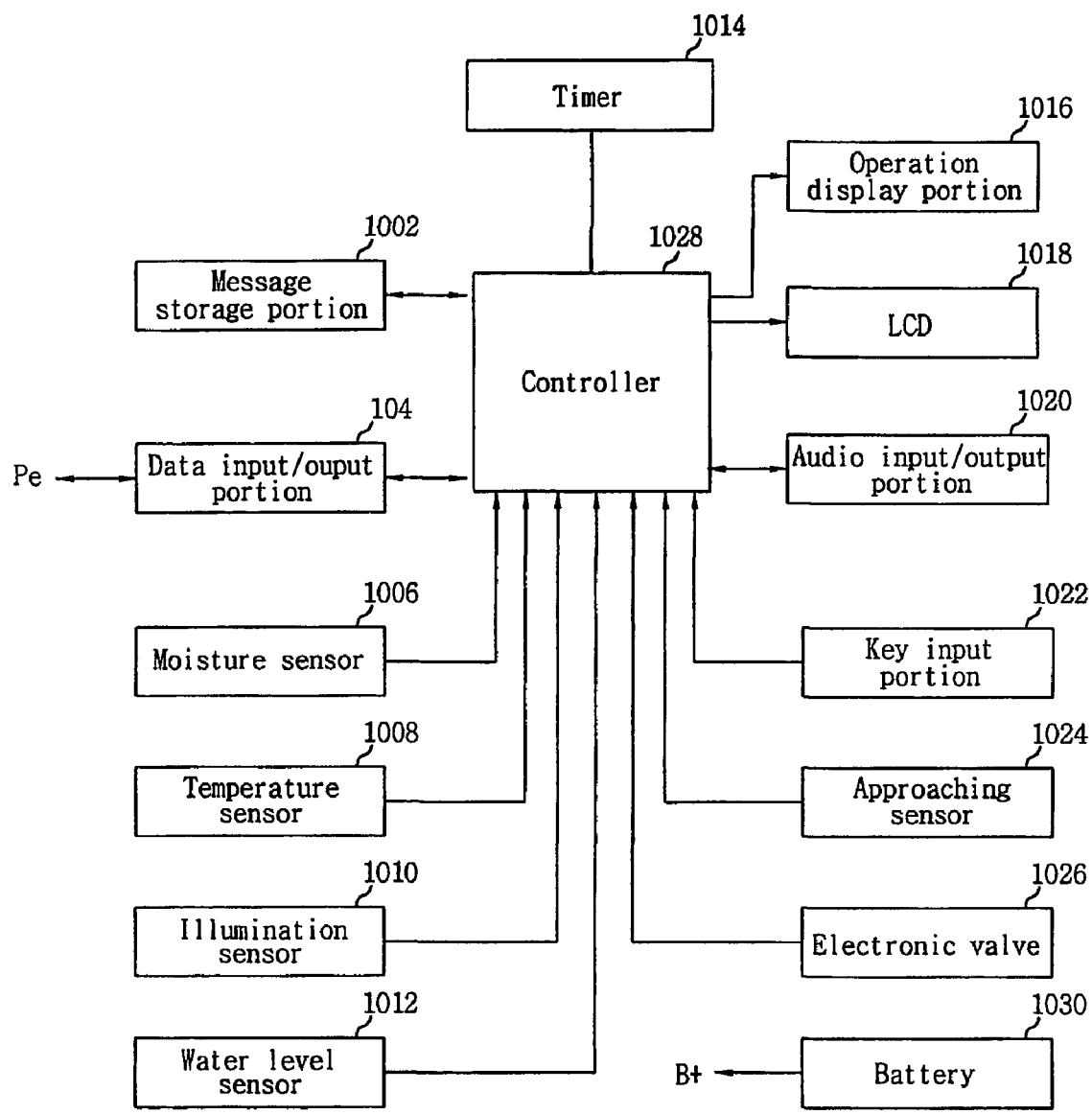
FIG. 10 is an internal block diagram of the digital plant pot controlling apparatus shown in FIG. 7.

FIG. 10 is an internal block diagram of the digital plant pot controlling apparatus shown in FIG. 7, including a message storage portion 1002, a data input/output portion 1004, a moisture sensor 1006, a temperature sensor 1008, an illumination sensor 1010, a water level sensor 1012, a timer 1014, an operation display portion 1016, an LCD 1018, an audio input/output portion, a key input portion 1022, an approaching sensor 1024 and an electronic valve 1026, these circuits being connected to a controller 1028. The respective circuits receive power from a battery 1030.

Here, the temperature sensor 1008 may be a sensor for detecting the temperature of ambient air and a touch sensor of detecting the temperature of soil in the plant pot.

The operation display portion includes a lamp such as an LED to display the operational state of the apparatus. Thus, the operational state can be displayed by flicking of the lamp instead of output of audio messages.

The approaching sensor 1024 may be an ultrasonic sensor, an optical sensor for detecting the approaching of a person who takes care of the plant pot, or a touch sensor for detecting the person's touch of the plant pot or controller.

FIGS. 11 through 15 are flow charts for explaining the operation of the digital plant pot controlling apparatus shown in FIG. 7.

Figure 11:
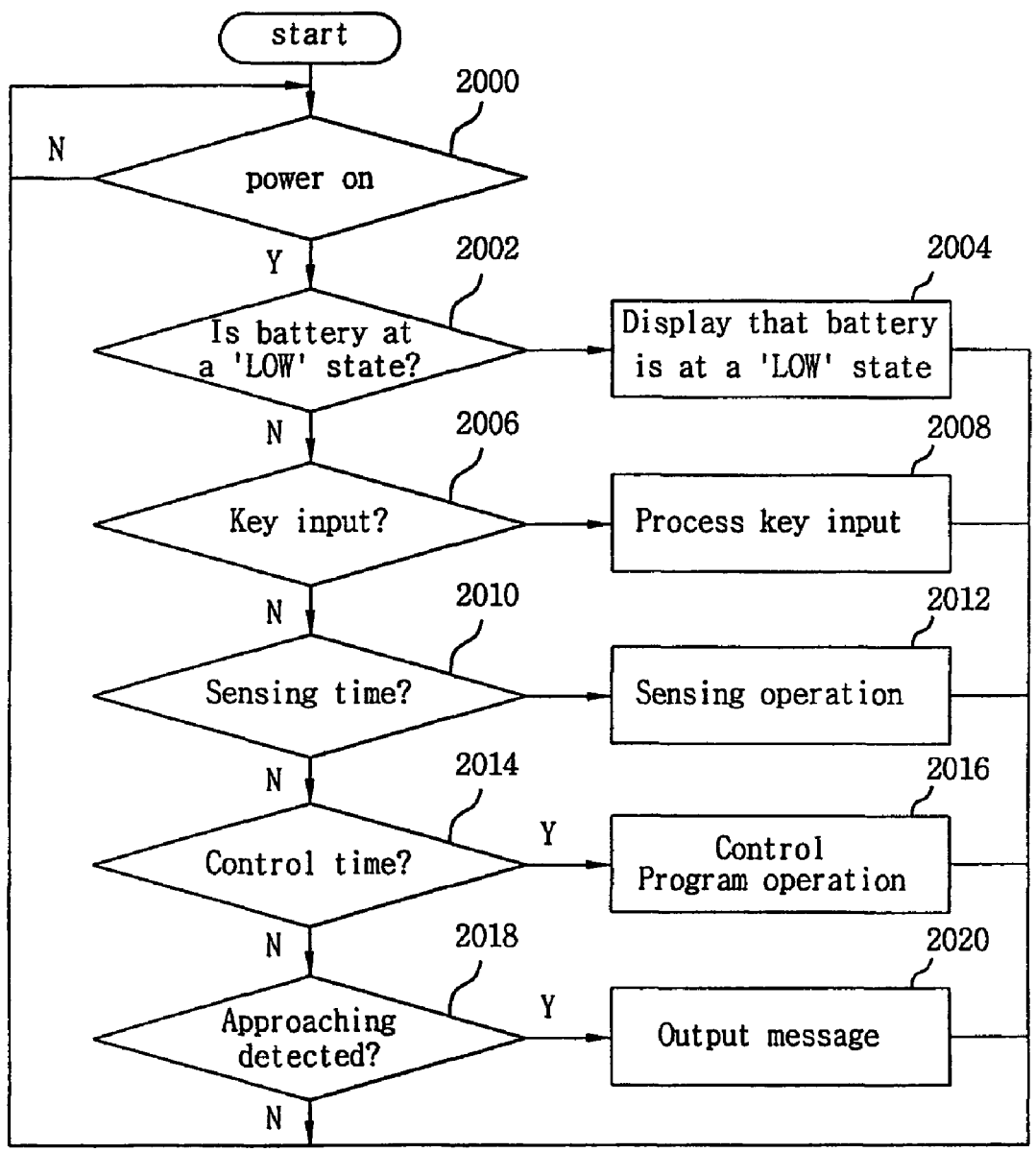
FIGS. 11 through 15 are flow charts for explaining the operation of the digital plant pot controlling apparatus shown in FIG. 7.

In the main program shown in FIG. 11, a power 'ON' state is checked (step 2000) and a battery 'LOW' state is checked in the power 'ON' state (step 2002). If the battery 'LOW' state is checked n step 2002, it is displayed on the LCD (step 2004).

The controller checks whether there-is a key input (step 2006). If yes, the corresponding key input is processed (step 2008).

The controller checks the time by means of a timer. If the time is a sensing time (step 2010), a sensing operation is performed (step 2012). Also, if the time is a control time (step 2014), a control program is performed (step 2016).

The controller detects the approach of a user by means of the approaching sensor (step 2018). If the user approaches, a corresponding message is output (step 2020).

Figure 12:
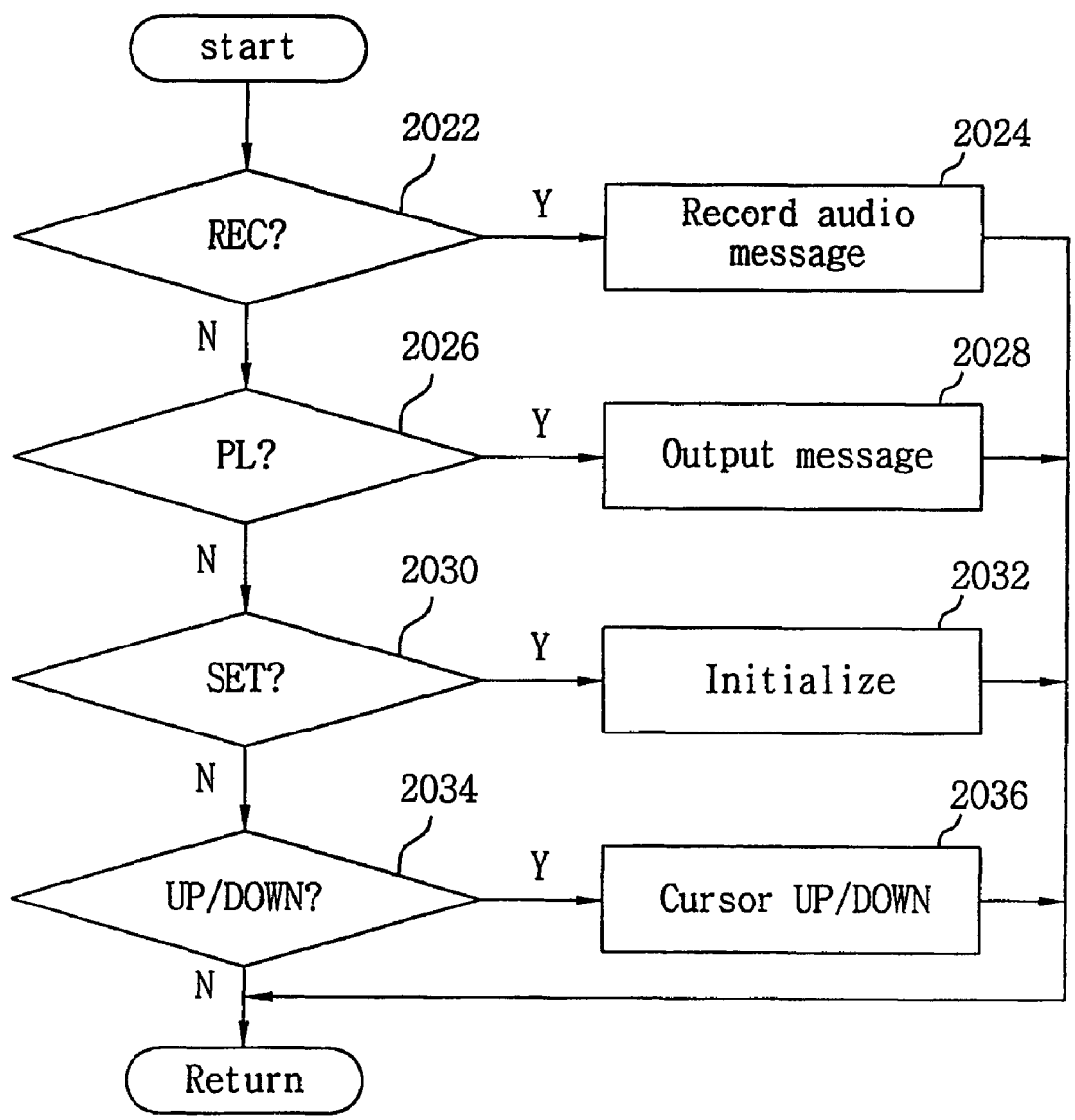

Referring to FIG. 12, the key input operation is performed by checking an input of the REC key (step 2022), and inputting a user's voice through an audio input/output portion and storing the audio data input to the message storage portion (step 2024). In inputting the PL key (step 2026), a corresponding voice message is read from the message storage portion and is audio-output through the audio input/output portion (step 2028).

In inputting the SET key (step 2030), a corresponding setting operation is performed (step 2032). In inputting the up/down keys (step 2034), the cursor is moved to a corresponding position on the screen of the LCD (step 2036).

Figure 13:
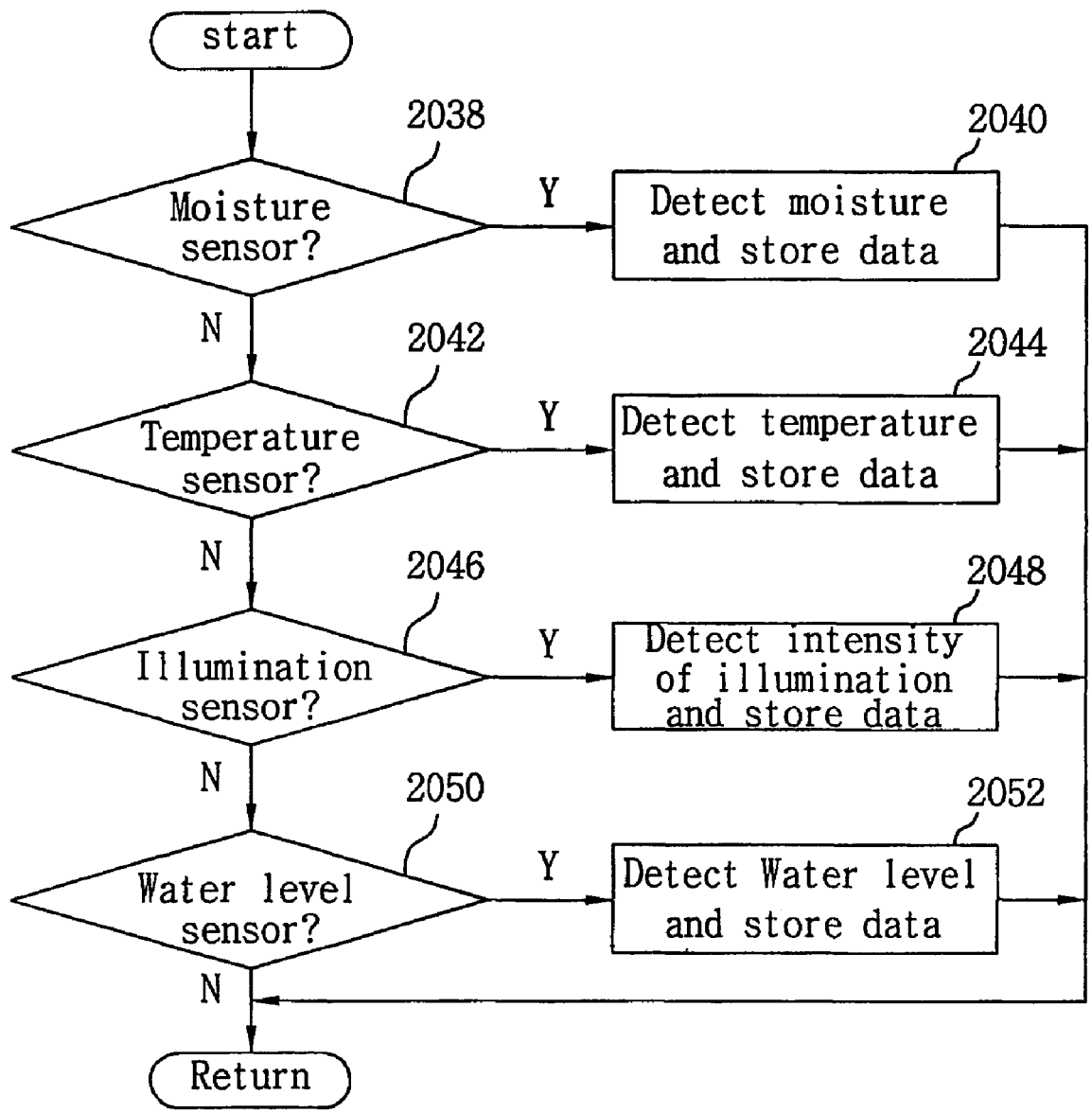

Referring to FIG. 13, the sensing operation is performed when checking a sensing time. In checking by the moisture sensor (step 2038) and the detected moisture data is stored (step 2040). In checking by the temperature sensor (step 2042), the detected temperature data is stored (step 2044). In checking by the illumination sensor (step 2046), the detected intensity of illumination is stored (step 2048). In checking by the water level sensor, the detected water level data is stored (step 2052). The sensor scanning time is adjustable in units of 10, 30 or 60 minutes.

Figure 14:
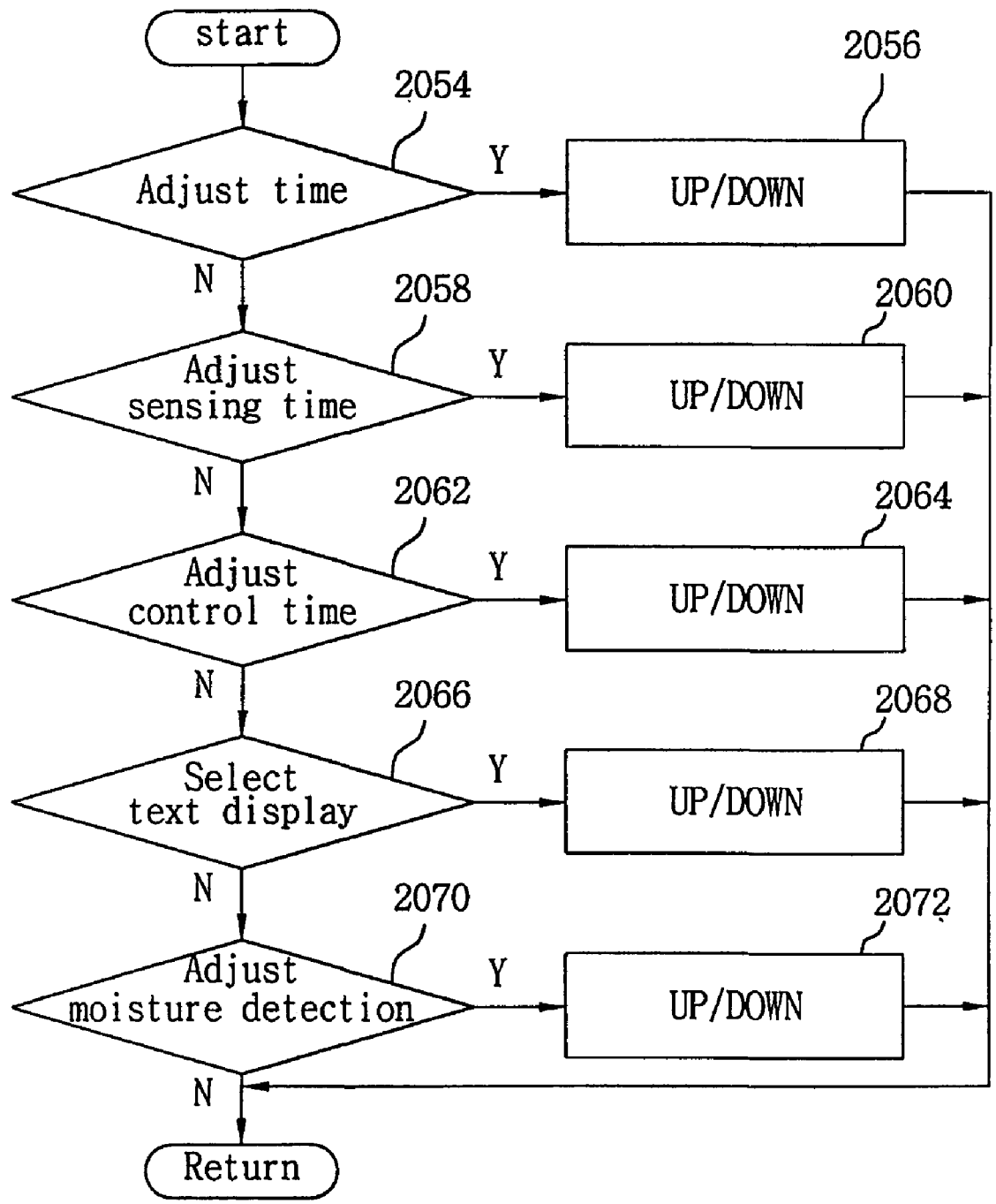

Referring to FIG. 14, a time adjustment mode, a sensing time adjustment mode, a control time adjustment mode, a text display selection mode, a moisture detection adjustment mode and so on can be selected from the screen of the LCD by inputting the SET key.

In the time adjustment mode (step 2054), items representing year, month, day and time are selected and adjusted using the up/down keys (step 2056).

In the sensing time adjustment mode (step 2058), a sensing time is adjusted using the up/down keys (step 2060).

In the control time adjustment mode (step 2062), a control time is adjusted using the up/down keys (step 2064).

In the text display selection mode (step 2066), one among various text messages displayed on the LCD, is selected by a user using the up/down keys (step 2068).

In the moisture detection adjustment mode (step 2070), the upper and lower limits of the water level are adjusted by the user using the up/down keys.

Figure 15:
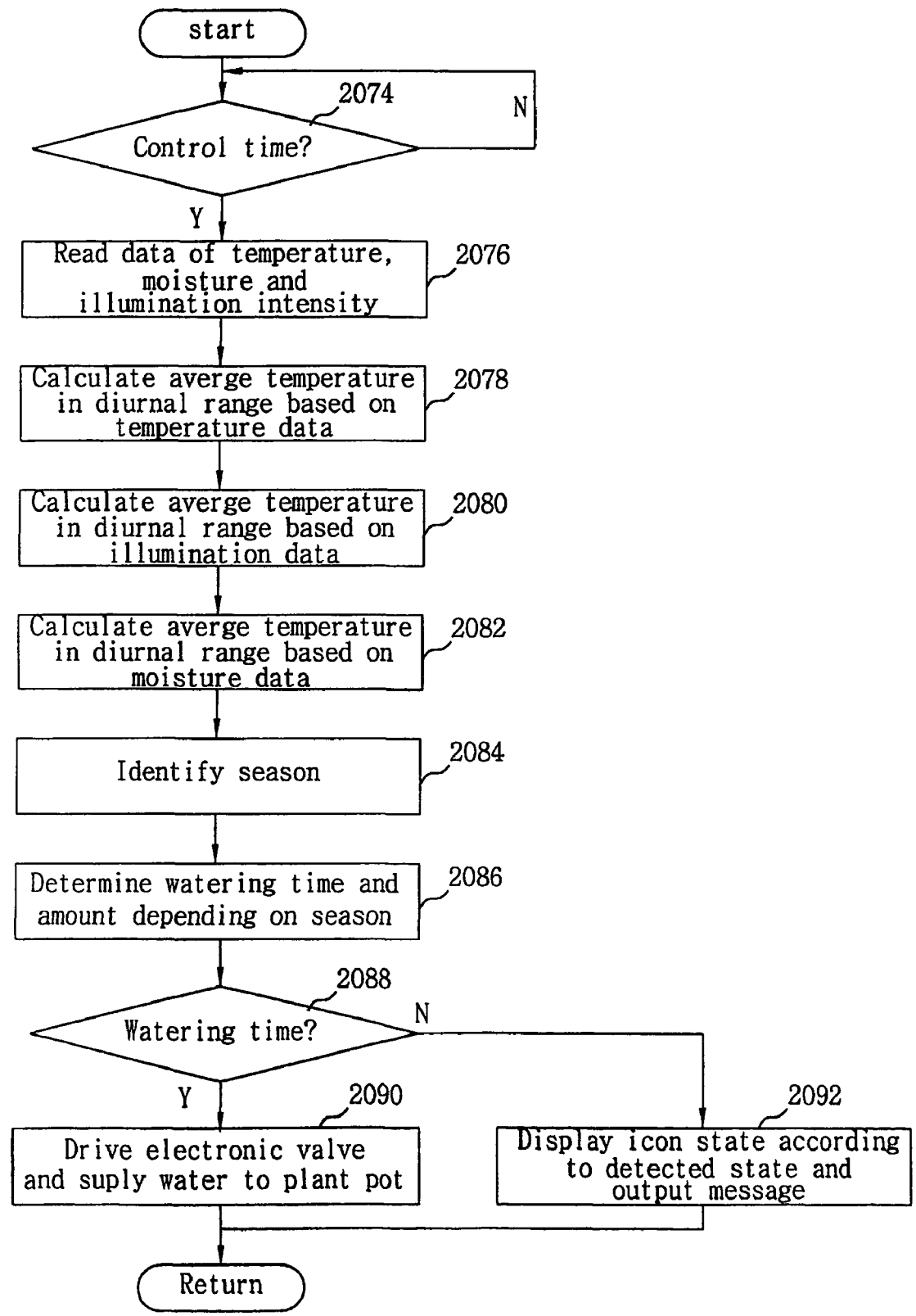

Referring to FIG. 15, the control program is performed by checking a control time according to the user's set control time (step 2074). If the control time is checked, the sensing operation is performed to read stored data of temperature, moisture and intensity of illumination (step 2076).

The highest temperature and the lowest temperature of a day are checked using the read temperature data to obtain a diurnal range, and an average temperature of a day is calculated (step 2078).

Also, an amount of sunshine of a day is calculated using the read illumination data and an average intensity of illumination is calculated (step 2080).

The current season is confirmed using the obtained data and time data (step 2084) and the optimum watering time is determined based on the season (step 2086). It is checked whether the watering time determined in step 2086 has come (step 2088). If yes, the electronic valve is driven to supply an appropriate amount of water to the plant pot (step 2090).

If not the watering time, a modified icon varying according to the growth periods of the plant, that is, birth, infant, child, juvenile, adjust and aged periods, is displayed and a corresponding message is output (step 2092).

Alternatively, the apparatus according to the present invention can be embodied off-line. In other words, the apparatus a voice message can be input by a recording operation and the input voice message can be played back, without connection with a personal computer on-line.

In the case when hearing a voice message is not intended, switching into a lamp mode is possible. In the lamp mode, the control state of the plant can be displayed by the operation display portion, for example, a necessity of watering can be displayed by flicking.

As described above, according to the present invention, a digital plant pot controller is mounted on a plant pot, a sender's voice message is recorded on a memory when delivering the plant pot and a recipient can hear the sender's voice message when receiving the plant pot, so that the sender can give the recipient the plant pot as a present with congratulatory messages.

Also, the plant pot control state is notified of by a moisture sensor in the form of messages, thereby easily controlling the plant pot, enjoying the plant planted in the plant pot for a long time. Since the sender's voice message can be heard any time even after the lapse of much time, the recipient appreciates the sender's true heart, promoting friendly relations among people.

Further, information on a plant planted on the plant pot is displayed in text, a lot of things about the plant can be learned and the plant can be taken care of with affection and devotion.

Also, a message of watering request or a message of gratitude for watering is audio-output from the plant pot and the current state of the plant pot is displayed with an icon. That is to say, communication between the plant pot and the user is allowed, which may foster children's interest in taking care of the plant, leading to affection for the plant. Thus, children can be emotionally developed and can get useful information on the plant.

Although the present invention has been described with reference to particular preferred embodiments, i will be apparent to one skilled in the art that various changes and modifications may be made without departing from the spirit and scope of the invention appended in the claims.

What is claimed is:

1. An apparatus of digitally controlling a plant pot comprising:
   a case coupled to the outer circumference of the pot;
   a moisture sensor drawn from the case, for detecting moisture in soil contained in the pot;
   a liquid crystal display (LCD) installed in the case, for displaying a text or icons;
   an audio output portion for outputting a voice message, a message storage portion for storing an orderer's message and controlling messages:
   a data input/output portion connected to a personal computer, for inputting/outputting message data;
   a key input portion for inputting key signals through a key pad such as a power key or a record key;
   a battery for supplying power to each circuit block; and
   a controller for performing a plant pot controlling program, reading a message stored in the message storage portion in response to the moisture sensor and a signal from the key input portion to output a voice to the audio output portion, displaying the name of a plant planted in the pot and information for controlling the plant on the LCD in the form of a text, displaying a current control state of the plant pot in the form of an icon, and downloading the message data from the personal computer through the data input/output portion or uploading the control state data to the personal computer.

2. The apparatus according to claim 1, wherein the data input/output portion is constituted by an RS232 or USB interface circuit for serial data communication with the personal computer.

3. The apparatus according to claim 1, wherein the data input/output portion is an AM or FM wireless transceiver for wireless data communication with the personal computer.

4. The apparatus according to claim 1, wherein the downloaded data is supplied in the form of audio, video, MP3, WMA, ASF, RAM, RA, WAV or a combination thereof.

5. The apparatus according to claim 1, wherein the icons are expressed such that plant pot controlling state data is drawn for cases where water is supplied at an appropriate time and where water is not supplied at an appropriate time, in response to the output of a message requesting for taking care of the plant pot, and a fresh or withered state of the plant pot is reflected on the icon to be displayed.

6. The apparatus according to claim 1, wherein the icons are expressed according to growth periods of the plant.

7. A method of digitally controlling a plant pot comprising the steps of:
 audio-outputting an orderer's voice message on delivery through initialization;
 displaying the name of a plant planted in the plant pot, displaying information related to the plant in the form of text and displaying a plant pot control state with icons at normal times;
 detecting the moisture contained in the plant pot and determining whether watering is necessary or not;
 if it is determined that watering is necessary, displaying the determination in the form of a text and audio-outputting a message requesting for taking care of the plant;
 preparing plant pot control state data for cases where water is supplied at an appropriate time and where water is not supplied at an appropriate time, in response to the output of the message requesting for taking care of the plant pot; and
reflecting and displaying a fresh or withered state of the plant on icons in response to the prepared plant pot control state data.

8. An apparatus of digitally controlling a plant pot comprising:
 a case connected to the outer circumference of a plant pot:
 an electronic valve adhered to the case, for controlling a supply of water to the plant pot;
 a water tank connected to the electronic valve,
 a moisture sensor drawn from the case, for detecting moisture in the soil contained in the plant pot;
 a temperature sensor embedded in the case, for detecting the ambient temperature;
 an illumination sensor embedded in the case, for detecting the intensity of ambient illumination;
 a liquid crystal display installed in the case, for displaying a text or icons;
 an audio output portion installed in the case, for outputting a voice message;
 a message storage portion for storing orderer's messages and control messages;
 a data input/output portion connected to a personal computer, for inputting/outputting message data;
 a key input portion for inputting key signals through a key pad including a power key and a record key;
 a battery for supplying power to the respective circuits; and
 a controller for performing a plant pot controlling program, reading a message stored in the message storage portion in response to the moisture sensor, the illumination sensor, the temperature sensor and a signal from the key Input portion to output a voice to the audio output portion, displaying the name of a plant planted in the pot and information for controlling the plant on the LCD in the form of a text, displaying a current control state of the plant pot in the form of an icon, downloading the message data from the personal computer through the data input/output portion or uploading control state data to the personal computer, and supplying water to the plant pot by controlling the electronic valve if watering is necessary.

9. An apparatus of digitally controlling a plant pot comprising:
 a case connected to the outer circumference of a plant pot;
 an electronic valve adhered to the case, for controlling a supply of water to the plant pot;
 a water tank connected to the electronic valve,
 a moisture sensor drawn from the case, for detecting moisture in the soil contained in the plant pot;
 a temperature sensor embedded in the case, for detecting the ambient temperature;
 an illumination sensor embedded in the case, for detecting the intensity of ambient illumination;
 a liquid crystal display installed in the case, for displaying a text or icons;
 an audio output portion Installed in the case, for outputting a voice message;
 a message storage portion for storing orderer's messages and control messages;
 a key input portion for inputting key signals through a key pad including a power key and a record key;
 a battery for supplying power to the respective circuits; and
 a controller for performing a plant pot controlling program, reading a message stored in the message storage portion in response to the moisture sensor, the illumination sensor, the temperature sensor and a signal from the key input portion to output a voice to the audio output portion, displaying the name of a plant planted in the pot and information for controlling the plant on the LCD in the form of a text, displaying a current control state of the plant pot in the form of an icon, and supplying water to the plant pot by controlling the electronic valve if watering is necessary.

* * * * *